Figure 6:
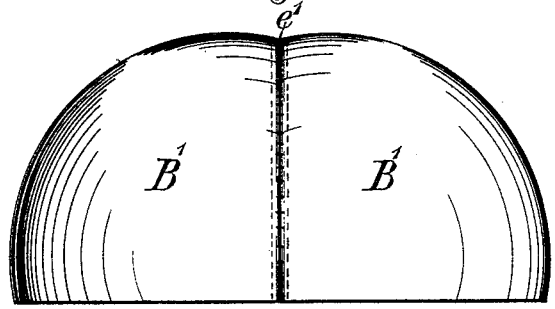

(No Model.) 5 Sheets—Sheet 1.
W. HOWARD.
METHOD OR PROCESS OF MAKING FOOT BALLS.
No. 405,999. Patented June 25, 1889.
Fig. 1.
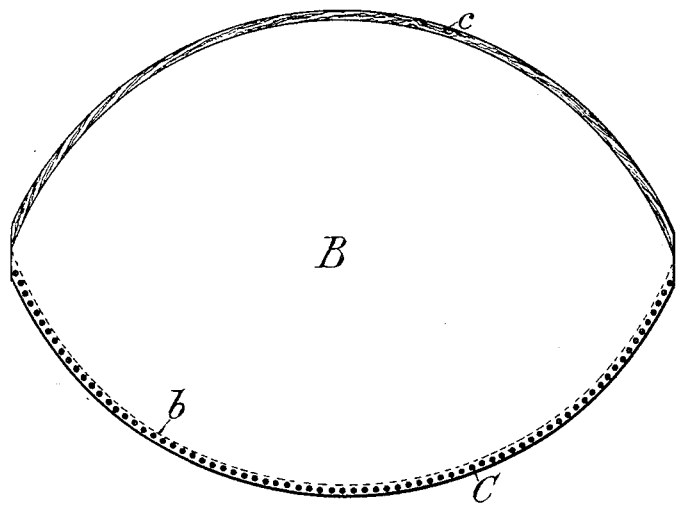
Fig. 2.
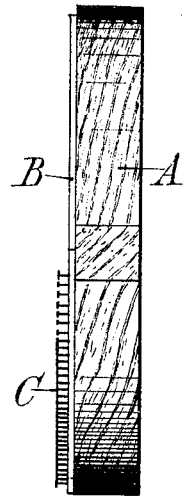
Fig. 5.
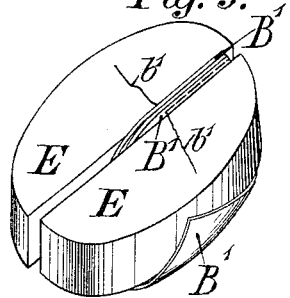
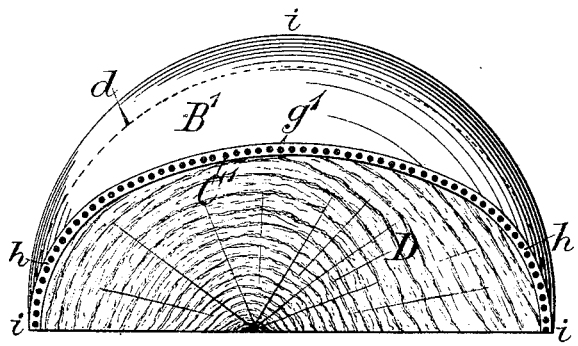
Fig. 3.
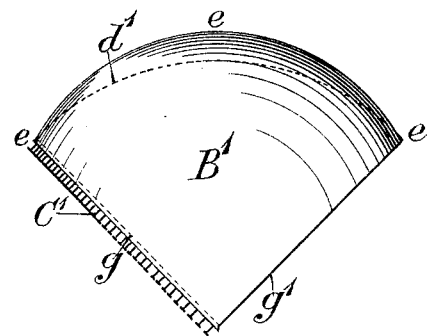
Fig. 4.
Witnesses.
L. W. Hitchcock.
Alfred Tansley.
Inventor:
William Howard
per Henry Harington Leigh
his Attorney (No Model.) 5 Sheets—Sheet 2.
W. HOWARD.
METHOD OR PROCESS OF MAKING FOOT BALLS.

No. 405,999. Patented June 25, 1889.

Witnesses.
L. W. Hitchcock.
Alfred Tansley.

Inventor.
William Howard.
per Henry Harrington Leigh
his Attorney (No Model.)  5 Sheets—Sheet 3.
W. HOWARD.
METHOD OR PROCESS OF MAKING FOOT BALLS.

No. 405,999. Patented June 25, 1889.

Witnesses:
L. W. Hitchcock.
Alfred Tansley.

Inventor:
William Howard,
per Henry Harrington Leigh
his Attorney.

(No Model.)  5 Sheets—Sheet 4.

W. HOWARD.
METHOD OR PROCESS OF MAKING FOOT BALLS.

No. 405,999.  Patented June 25, 1889.

Witnesses.
L. W. Hitchcock.
Alfred Tansley.

Inventor.
William Howard.
per Henry Harington Leigh
his Attorney.

(No Model.) 5 Sheets—Sheet 5.
W. HOWARD.
METHOD OR PROCESS OF MAKING FOOT BALLS.

No. 405,999. Patented June 25, 1889.

Witnesses.
L. W. Hitchcock.
Alfred Tansley.

Inventor:
William Howard,
per Henry Harington Leigh
his Attorney.

UNITED STATES PATENT OFFICE.

WILLIAM HOWARD, OF LONDON, COUNTY OF SURREY, ENGLAND.

METHOD OR PROCESS OF MAKING FOOT-BALLS.

SPECIFICATION forming part of Letters Patent No. 405,999, dated June 25, 1889.

Application filed September 4, 1886. Serial No. 212,765. (No model.) Patented in England September 18, 1885, No. 11,089, and December 1, 1885, No. 14,752.

*To all whom it may concern:*

Be it known that I, WILLIAM HOWARD, foot-ball manufacturer, a subject of the Queen of Great Britain and Ireland, residing at No. 40 Webber Row, Blackfriars, London, S. E., in the county of Surrey, England, have invented certain new and useful Improvements in the Method or Process of Making Foot-Balls, (for which I have obtained Letters Patent in Great Britain, No. 11,089, dated September 18, 1885, and No. 14,752, dated December 1, 1885,) of which the following is a specification.

My invention relates to improvements in the manufacture of foot-balls, and relates to those which consist, substantially, of two parts—the cover or outer skin of leather and the bladder or lining of india-rubber. Up to the date of this invention it has been the general practice to make foot-ball covers of several pieces, each one cut on both its edges according to an arc of the surface of the ball to be produced, including margins by which it could be sewed to the adjoining piece. The number of pieces it has been usual to use in making a foot-ball cover has been six and sometimes eight. The use of so many pieces has necessitated a great (and now unnecessary) amount of cutting out as well as careful sewing, each seam having to be carefully made, to prevent the perfect spherical or oval shape of the finished ball being marred by indifferent workmanship.

My improved method or process consists in making a round or an oval foot-ball cover out of four or two pieces of leather, which are first cut to a proper shape and then wet and stretched upon blocks of a peculiar shape, by which means they are compelled to assume and retain the particular shape necessary to produce a round or an oval cover. The rubber linings are also made of fewer parts than heretofore.

I attain the aim and purpose of my invention by the use of the method or process hereinafter described, and illustrated in the accompanying figures, in which like parts are marked throughout the figures in which they occur with the same reference-letter.

Figure 7:
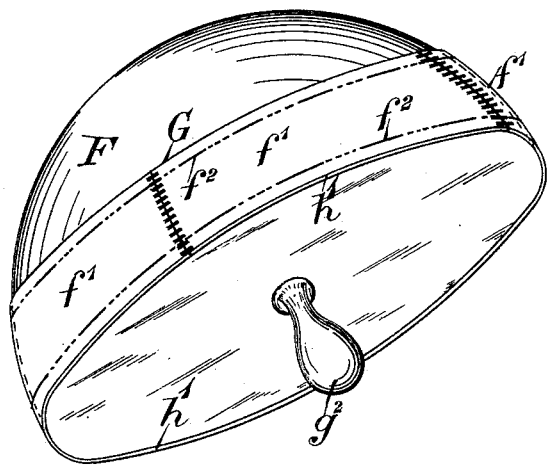
Figure 8:
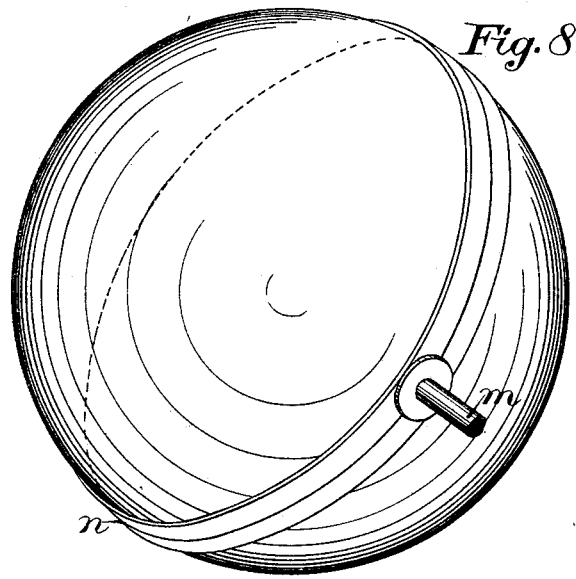
Figure 9:
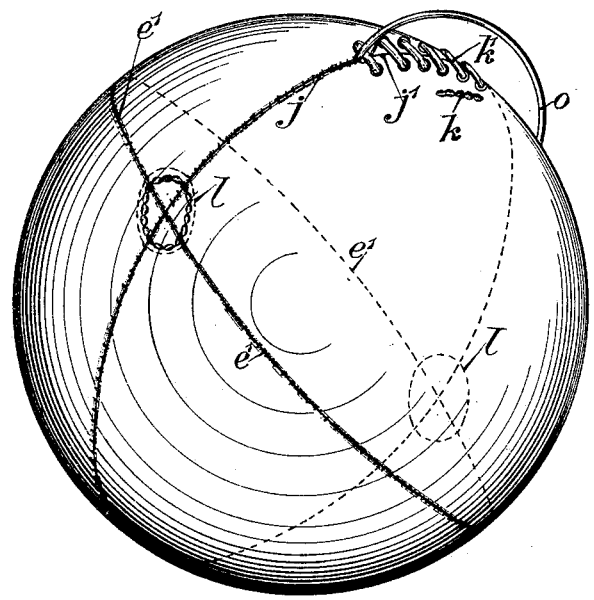
Figure 10:
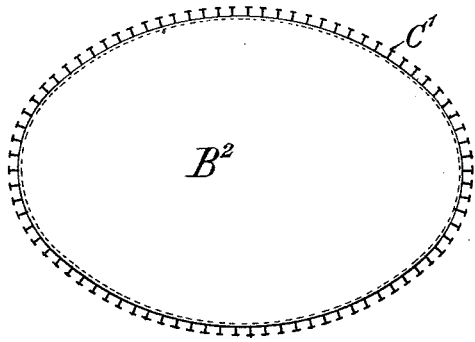
Figure 11:
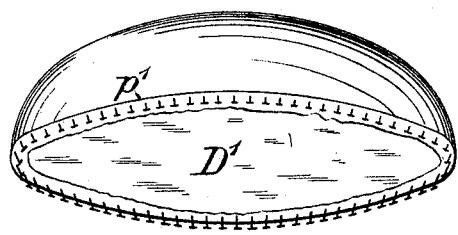
Figure 12:
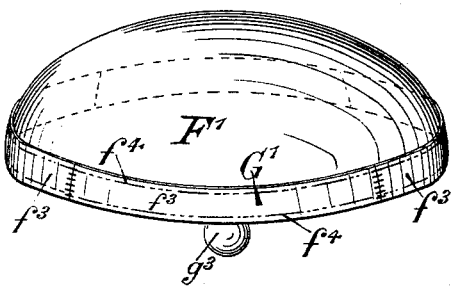
Figure 14:
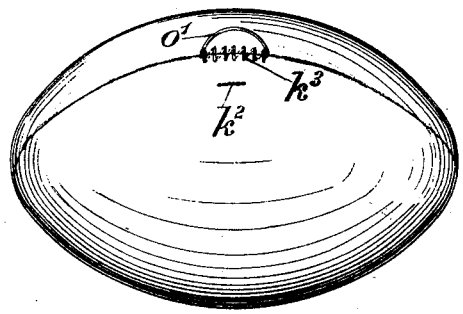
Figure 13:
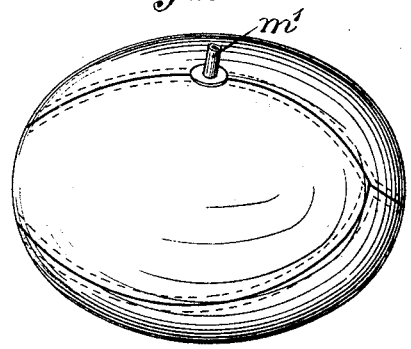
Figure 15:
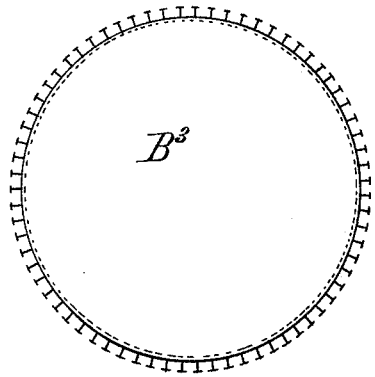
Figure 16:
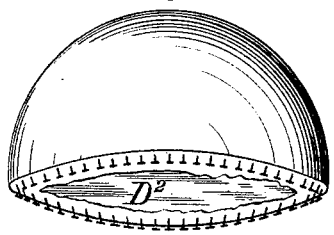
Figure 17:
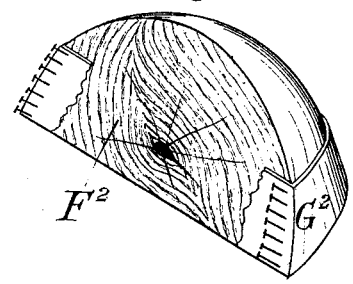
Figure 18:
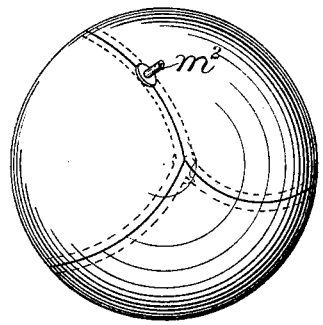
Figure 19:
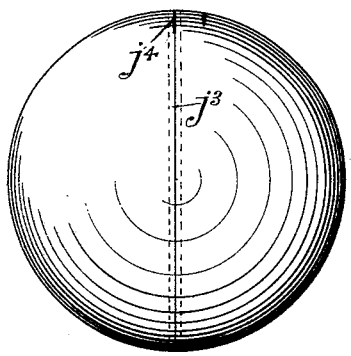
Figure 20:
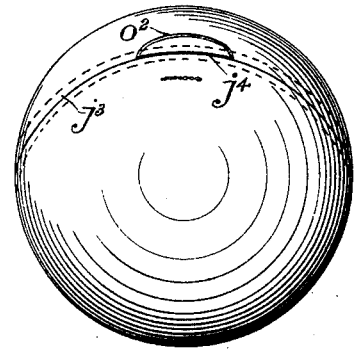

Figures 1 to 9 illustrate the manufacture according to my invention of a round (*i. e.*, spherical) foot-ball, the leather cover of which is made out of four pieces. Fig. 1 illustrates in plan a templet upon which a piece of leather is being stretched, as well as the line along which it is cut off the templet. Fig. 2 is an end elevation corresponding to Fig. 1. Fig. 3 is a side elevation of a wood block upon which a piece as cut from the templet is being stretched and concaved. Fig. 4 is an end elevation of the same. Fig. 5 illustrates the method of sewing two concaved pieces together to produce a half-cover. Fig. 6 is an elevation of a half-cover after the seam has been made and hammered flat. Fig. 7 is a perspective view of a block with a lining-band stretched thereupon. Fig. 8 shows the india-rubber bladder or lining. Fig. 9 shows the finished ball. Figs. 10 to 14 illustrate the manufacture according to my invention of an oval foot-ball, the leather cover of which is made out of two pieces of leather. Fig. 10 is a plan of a piece of leather being stretched upon a wooden templet by being nailed thereto along the edge. Fig. 11 is a perspective view of a block upon which a piece of leather, after being stretched in the manner illustrated in Fig. 10, is shown as being further stretched and concaved. Fig. 12 is a perspective view of a block with a lining-band being stretched and shaped thereupon. Fig. 13 is a perspective view of an india-rubber bladder or lining made in three pieces, with a mouth-piece or inflating-tube. Fig. 14 is a perspective view of a finished foot-ball. Figs. 15 to 20 illustrate the manufacture of a round foot-ball, the leather cover of which is made out of two pieces of leather. Fig. 15 is a plan showing one piece of leather being stretched upon a round templet, to the margin of which it is nailed. Fig. 16 is a perspective view showing a piece of leather undergoing the process of being stretched and concaved upon a block of a suitable shape. Fig. 17 is a perspective view of a lining-band undergoing the process of being stretched and shaped. Fig. 18 is a perspective view of the india-rubber bladder or lining made in three pieces with a mouth-piece or inflating-tube. Figs. 19 and 20 are respectively elevation and perspective view of a finished ball.

The first step in the manufacture of a four-piece round foot-ball according to my invention is that of stretching and shaping the pieces of leather, the sewing together of which produces a foot-ball cover.

Referring to Figs. 1 to 9, A is a wooden templet having in plan the outline of an ellipse, with the ends cut off parallel to the minor axis of the same.

B is a piece of leather of suitable thickness, according to the diameter of the ball to be produced, cut out to the templet A, wet to saturation in water, (I prefer that the water should be lukewarm,) stretched, and nailed upon the templet.

C shows the line of nails which run all round the templet in a line parallel with and about half or three-quarters of an inch within its edge. When the leather has dried, (having during the process of drying settled into the enlarged size to which it was stretched,) it is cut off from the templet along the line $b$, and the remnant margins and nails are removed from the templet, which is then ready to receive a second piece of leather.

Fig. 1 shows the templet and piece of leather, the latter cut away on one side and the nails and strip of leather removed from the templet, showing a margin $c$.

Four pieces of leather having been prepared as described, the next step in the process of the manufacture of a four-piece round foot-ball is that of concaving the four pieces. This is illustrated in Figs. 3 and 4.

D is a wood block having the shape of a quarter of a sphere plus the convex enlargement above the dotted lines $d\ d'$, which indicate the termination of what would be the surface of the quarter-sphere were it not for the said convex enlargement.

B' is a piece of leather as cut from the templet A, wet to saturation in lukewarm water, and stretched upon the block D. It is first stretched across the block along the line $e\ e\ e$, turned round the edges $g$, which bound the convex surface, and nailed to the flat sides of the block. The stretching and nailing are proceeded with gradually and regularly toward each end or nose of the block. Either side of the block will then present the appearance represented in Fig. 3, in which C' is the line of nails.

When the leather B' is dry, it will be found to have been permanently concaved according to the radius of the convex surface of the block D, when it is to be cut off by passing a knife along the edges $g'\ g'$ from one nose of the block to the other. This operation releases the piece B', leaving two margins of leather $h$ and two lines of nails C' on the block, from which they must be removed before another piece B can be concaved. Fig. 4 shows one margin and line of nails removed.

In settling the dimensions of the templet A and block D to produce pieces for a four-piece ball of a given size, it is of course necessary to make allowance for the margins $c$ and $h$, Figs. 1 and 3, as well as for the contraction caused by the sewing. Figs. 1 to 4 and 6 to 9 are all drawn to the same scale, and it will be found that the length of a concaved piece B', measured along the line $i\ i\ i$, Fig. 3, is equal to the major axis of a templet A or of a piece B, and that the width of a piece B', measured along the line $e\ e\ e$, Fig. 4, is equal to the minor axis of a piece B when cut off the templet A.

The second step in the manufacture of a four-piece round foot-ball according to my invention is that of sewing the four pieces together.

I commence by bringing two concaved pieces B' together, with their outer faces touching and two edges level, and grip them in any convenient way between two blocks E E, Fig. 5. The thread $b'$ is first passed through the two pieces B' at a point close to one end of the edges and the sewing proceeded with, as shown in the figure, until the seam is finished as far as the opposite ends of said edges. The seam $e'$ is then hammered flat, when the two pieces will present in elevation the appearance represented in Fig. 6, in which the dotted lines on each side of the seam $e'$ show the edges $g'$ folded back on the inside.

It has been pointed out that the blocks D are more than quarter-spheres to the extent of the convex extensions beyond the lines $d\ d'$, Figs. 3 and 4. The extra length and width which are thereby given to the concaved pieces B' along the lines $i\ i\ i$ and $e\ e\ e$, respectively, provide the leather which is taken up by the seam $e'$. Even after this seam is made there is still an excess of convexity beyond the surface of a hemisphere remaining, as shown in Fig. 6, which excess provides leather to be taken up in making the final seam $j$. Two other concaved pieces B' are then sewed together in the same way. Before the final seam $j$, Fig. 9, by which two pairs of concaved pieces B' are joined to produce one cover is made, two lining-bands G, one for each half-cover, must be made. The method of making these (the third step in the process) is illustrated in Fig. 7, which is a perspective view of a band-shaping block F, with one band G stretched upon it and undergoing the process of shaping. Each band is made of thin leather in four quarters $f'$, and is wet and stretched upon the block by forcing it down till its edge $h'$ is flush with the face of the block and taken off when it is dry. Two waxed threads $f^2$ are inserted near its edges to prevent it stretching during the subsequent processes. These two threads are of the length of internal circumferences of the finished ball, taken at their respective planes. Inasmuch as the circumference of the face of the block F is in excess of the internal circumference of a half-cover, Fig. 6, at its edge, a band G will pucker when it is inserted in a half-cover with its edge $h'$ flush with the edge of the half-cover. The puckering is distributed equally throughout the band, which is then tacked to the edge of the

I claim—

1. The hereinbefore-described method or process of making foot-ball covers, consisting in, first, stretching wet leather gussets upon a flat surface and leaving them thereon till they are dry; second, concaving them by again wetting them and stretching them upon a convex block; third, preparing leather lining-bands, one for each half-cover, shaping them to the contour of the said half-covers by wetting and stretching them upon a convex block, leaving them till they are dry, and then tacking a band to the inside of each half-cover along the edge; fourth, sewing the two half-covers together, as set forth.

2. The hereinbefore-described method or process of making foot-balls, consisting in, first, stretching wet leather gussets upon a flat surface and leaving them thereon till they are dry; second, concaving them by again wetting them and stretching them upon a convex block; third, preparing leather lining-bands, one for each half-cover, shaping them to the contour of the said half-covers by wetting and stretching them upon a convex block, leaving them till they are dry, and then tacking a band to the inside of each half-cover along the edge; fourth, sewing the two half-covers together, and, fifth, lining the cover produced by the junction of the two half-covers with a rubber bladder, inflating the latter, tying its mouth, and finally sewing or lacing up the mouth of the cover, as set forth.

In testimony whereof I have hereunto set my hand.

WILLIAM HOWARD.

Witnesses:
CHAS. S. WOODROFFE,
*No. 22 Southampton Buildings, London, W.C.*
WALTER J. SKERTEN,
*17 Gracechurch Street, London, E. C.* half-cover. A second band having been prepared and tacked to its half-cover in the manner just described, the edges of both half-covers are immersed to saturation in water (preferably lukewarm) to a depth of about half an inch.

The fourth step is the junction of two half-covers and the completion of the ball, and commences with sewing the central or final seam $j$. (See Fig. 9.)

The two half-covers are brought together edge to edge, their outer faces touching, using the two blocks E E as a vise to hold them, and begin to sew through both half-covers and lining-bands at one end of what will be the mouth $j'$, in the way described with reference to Fig. 5. When I have sewed about a third of the seam, the cover is turned outside out, and as much of the seam as has just been made is hammered and rubbed down quite flat and smooth. The completion of the seam is then proceeded with, the unsewed edges being forced upward and the top of the ball-cover pressed downward till the said edges are exposed, and a further portion—say a second third—of the seam $j$ is made, and then hammered and rubbed down, as before. The remainder of the seam is finished in the same way, the last few inches of the unsewed edges being forced up through the mouth $j'$, so that they can be got at to be sewed together.

The various stretchings and shapings of leather described above are much facilitated by rubbing the various pieces, when wet, with a bone rubber. A round piece or shield of leather $l$ is then sewed and hammered down over each junction of the points of the four pieces of leather to prevent them turning inward when the ball is in use and injuring the rubber lining, their absence from the outside leaving the ball with a smoother surface. An internal flap-cover is next sewed to the cover along the line $k$, and the edges of the mouth pierced to receive the closing-lace $k'$.

The rubber lining or bladder (shown in perspective in Fig. 8) is made in two pieces, with a filling-tube $m$. This is next pushed into the cover, with its central seam $n$ coincident with the seam $j$ of the cover, the filling-tube projecting centrally through the mouth. The flap of the latter has a hole formed in its center, which allows the filling-tube to pass through it and itself to lie evenly upon the surface of the lining. Air is then forced into the lining at the filling-tube $m$, and as the process of inflation proceeds the seams of the cover stretch until the ball is spherical in shape and tense. The filling-tube $m$ is then tied up and tucked in under the cover, the mouth $j'$ is closed by the lace $k'$, the loop $o$ added, and the ball is ready for being varnished.

An oval foot-ball cover may be made in four pieces according to the method or process just described. The major axes of the templet A and block D will be adjusted accordingly.

The following is a description of the way in which an oval foot-ball cover is made out of two pieces of leather according to my invention.

Fig. 10 is a plan showing one of these two pieces $B^2$ cut, wet to saturation, and stretched upon a wooden templet, the edge of which is indicated by the dotted line. $C'$ is the line of nails. When the piece of leather $B^2$ has been stretched sufficiently and has become dry, the nails are drawn and the piece is again wet to saturation (preferably in lukewarm water) and stretched upon a wood block $D'$, to the flat face of which it is nailed, as shown in Fig. 11, and then rubbed with a bone rubber. This block is in shape half an elliptic solid. By the time the piece is dry it will have assumed the shape of the convex surface of the block when it is cut off along the line $p'$. Two half-covers having been concaved, as described with reference to Fig. 11, two lining-bands are to be prepared. These bands are prepared in the same way as the round bands described with reference to Fig. 7. In Fig. 12, $F'$ is the shaping-block, $g^3$ its handle, $G'$ the band consisting of four pieces $f^3$, and $f^4 f^4$ the two waxed threads to prevent the band from being stretched beyond the length of the threads.

The rubber lining of an oval ball may be made in two pieces only, or in three, as shown in Fig. 13.

The central and only seam of the cover, Fig. 14, is made in the same way as described with reference to Fig. 9. The mouth-flap is then sewed to the cover along the line $k^2$ and the edges of the mouth of the cover eyeleted to receive the lace $k^3$. The lining is put into the cover, with its filling-tube $m'$ projecting through a hole in the flap, which lies down upon the lining. The inflation of the ball, closing of the tube $m'$, and closing the mouth by the lace $k^3$, and addition of the loop $o'$, are effected as described with reference to Fig. 9.

A two-piece round foot-ball is made in substantially the same way as a two-piece oval ball.

Fig. 15 shows a round piece of leather $B^3$ wet and stretched upon a wooden templet, the edge of which is indicated by the dotted circle. When the piece is dry the nails are drawn, and it is again wet to saturation and stretched upon a hemispherical block $D^2$, to the face of which it is secured by nails.

Fig. 17 illustrates the preparation of a half lining-band $G^2$ upon a block $F^2$ having the shape of a quarter-sphere. Two half-bands are sewed together by their ends to make one band. The lining-band of a two-piece round ball may be made as described with reference to Fig. 7. The central and only seam $j^3$ is made in the way described with reference to Fig. 9. The insertion and inflation of the lining, tying its filling-tube $m^2$, closing the mouth $j^4$ by the lace $k^4$, and addition of the loop $o^2$ are effected in the same way as described with reference to Fig. 9.

Correction in Letters Patent No. 405,999.

It is hereby certified that Letters Patent No. 405,999, granted June 25, 1889, upon the application of William Howard, of London, County of Surrey, England, for an improvement in the "Method or Process of Making Foot-Balls," were erroneously issued to said Howard as owner of the entire interest in said invention; that said Letters Patent should have been issued to *George Johnson, of Ipswich, England*, said Johnson being assignee of the entire interest in said invention as shown by assignments of record in this office; and that said Letters Patent should be read with this correction therein that the same may conform to the record of the case in the Patent Office.

Signed, countersigned, and sealed this 27th day of August, A. D. 1889.

[SEAL.]

GEO. CHANDLER,
*Acting Secretary of the Interior.*

Countersigned:
ROBERT J. FISHER,
*Acting Commissioner of Patents.*